(12) United States Patent
Excoffier et al.

(10) Patent No.: US 12,547,360 B2
(45) Date of Patent: Feb. 10, 2026

(54) SYSTEM, DEVICE AND METHOD FOR ACTIVATING A FUNCTION OF A CONTENT-RENDERING DEVICE

(71) Applicant: Orange, Issy-les-Moulineaux (FR)

(72) Inventors: David Excoffier, Chatillon (FR); Franck Roudet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/574,662

(22) PCT Filed: Jun. 28, 2022

(86) PCT No.: PCT/FR2022/051276
§ 371 (c)(1),
(2) Date: Dec. 27, 2023

(87) PCT Pub. No.: WO2023/275477
PCT Pub. Date: Jan. 5, 2023

(65) Prior Publication Data
US 2024/0296000 A1    Sep. 5, 2024

(30) Foreign Application Priority Data

Jul. 1, 2021 (FR) .................................. 2107129

(51) Int. Cl.
*G06F 3/14* (2006.01)
*G06F 3/01* (2006.01)
*G06V 10/25* (2022.01)

(52) U.S. Cl.
CPC ............... *G06F 3/14* (2013.01); *G06F 3/013* (2013.01); *G06V 10/25* (2022.01)

(58) Field of Classification Search
CPC ............ G06F 3/14; G06F 3/013; G06V 10/25
See application file for complete search history.

(56) References Cited

U.S. PATENT DOCUMENTS

| | | | |
|---|---|---|---|
| 8,219,438 B1 | 7/2012 | Moon et al. | |
| 2003/0052911 A1 | 3/2003 | Cohen-Solal | |
| 2006/0110008 A1* | 5/2006 | Vertegaal | G06T 7/251 |
| | | | 382/103 |
| 2009/0012419 A1* | 1/2009 | McKee | A61B 5/163 |
| | | | 600/595 |
| 2016/0253735 A1* | 9/2016 | Scudillo | G06Q 30/0631 |
| | | | 705/14.58 |

(Continued)

OTHER PUBLICATIONS

International Search Report and Written Opinion dated Oct. 7, 2022 for Application No. PCT/FR2022/051276.

(Continued)

*Primary Examiner* — Jonathan A Boyd
(74) *Attorney, Agent, or Firm* — Knobbe, Martens, Olson & Bear, LLP

(57) ABSTRACT

A method for activating a function of a first content-rendering device is described. The method includes obtaining at least one image of at least part of the eyes of a person detected in a presence region associated with the first rendering device. The method also includes determining, by analysing the at least one obtained image, that the person is looking at a point of a first region of interest located close to and outside a region in which the first rendering device is located, and activating at least one function of the first rendering device.

13 Claims, 4 Drawing Sheets

(56) References Cited

U.S. PATENT DOCUMENTS

Figure 1A:
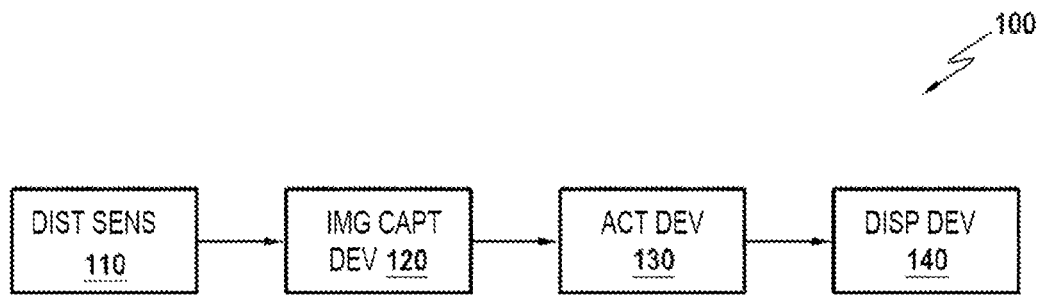

2017/0213234 A1    7/2017  Ahuja et al.
2019/0033965 A1*   1/2019  Raghunath .............. G06F 3/013
2021/0064129 A1*   3/2021  Yasuda ................... G06F 16/00

OTHER PUBLICATIONS

Anonymous, "Eye tracking—Wikipedia" Feb. 14, 2020 (Feb. 14, 2020). Retrieved from the Internet: https:/en.wikipedia.org/w/index.php?title=Eye_tracking&oldid=940786241 [retrieved on Apr. 28, 2021].

Kröger, et al., "What Does Your Gaze Reveal About You? On the Privacy Implications of Eye Tracking", International Conference on Intelligent Information Processing, IFIP Advances in Information and Communication Technology, US, vol. 576, Jan. 1, 2020 (Jan. 1, 2020), pp. 226-241, Springer New York LLC, Retrieved from the Internet: https://link.springer.com/content/pdf/10.1007/978-3-030-42504-3_15.pdf.

Punde, et al. "A study of eye tracking technology and its applications" 2017 1st International Conference on Intelligent Systems and Information Management (ICISIM), IEEE, Oct. 5, 2017 (Oct. 5, 2017), pp. 86-90.

\* cited by examiner

SYSTEM, DEVICE AND METHOD FOR ACTIVATING A FUNCTION OF A CONTENT-RENDERING DEVICE

RELATED APPLICATIONS

This application is the U.S. National Phase of Application No. PCT/FR2022/051276 entitled "SYSTEM, DEVICE AND METHOD FOR ACTIVATING A FUNCTION OF A CONTENT-RENDERING DEVICE" and filed Jun. 28, 2022, which claims the benefit of French Patent Application No. 2107129, filed Jul. 1, 2021, each of which is incorporated by reference in its entirety.

The invention relates to the general field of content-rendering devices, and relates more particularly to a method for activating a function of a content-rendering device. The invention also relates to a content-rendering system and to an activation device for activating a function able to be used in such a system.

In most businesses, paper labels are gradually being replaced by electronic shelf labels (ESL) or electronic price labels (EPL). The latest versions of electronic shelf labels are no longer simple passive price displays, but offer the ability to display additional information on a screen.

Document US 2013/0117153 discloses for example an electronic label coupled to a screen. The label is associated with a product, and has a processor configured to update the screen with product-specific information in real time. This involves for example displaying a promotional video, information about the use or assembly of the product, information about its availability, comments and reviews from customers who have purchased this product, or information about other complementary products.

However, these devices are for the most part supplied with power by batteries, and it would be advantageous to limit their energy consumption. The invention lies in this context.

According to a first aspect, the invention relates to a method for activating a function of a first content-rendering device, the method comprising the following steps:
- obtaining at least one image of at least a portion of the eyes of a person detected in a presence zone associated with the first rendering device;
- determining, by analyzing the at least one obtained image, that the person is staring at a point in a first region of interest located close to and outside a zone in which the first rendering device is located; and,
- activating at least one function of the first rendering device.

In correlation, the invention relates to an activation device for activating a function of a content-rendering device, comprising: an obtaining module for obtaining at least one image of at least a portion of the eyes of a person detected in a presence zone associated with the first rendering device; a gaze analysis module configured to determine, by analyzing the at least one obtained image, that the person is staring at a point in a first region of interest located close to and outside a zone in which the first rendering device is located; and a control module configured to activate at least one function of the first rendering device.

A content-rendering device is understood to mean any device configured to render visual content (for example text, images, videos), and/or audio content. It may be for example an electronic shelf label or a digital terminal equipped with at least one screen and/or with at least one loudspeaker, or a computer.

A region of interest corresponds for example to a zone of the space in which a product is placed (for example on the shelves of a store or in a display case).

In one particular embodiment, the region of interest is determined in a step of configuring the system, that is to say it is defined for example by an operator during the configuration of the rendering device.

As a variant, the region of interest is preconfigured during the manufacture of the rendering device. This variant is advantageous when the rendering device is associated with a region of interest that always has the same dimensions, and when the rendering device is intended to be systematically positioned at one and the same position with respect to the position of the region of interest.

A presence zone corresponds to a zone in which the presence of a person may be detected, for example using a sensor as described below. The presence zone is thus a zone covered by this sensor. Thus, and generally speaking, the proposed technique aims to activate at least one function of at least one content-rendering device if it is determined that a detected person has stared at at least one point in a region of interest. The proposed technique thus makes it possible to reduce the power consumption of the content-rendering device.

In one particular embodiment, the first content-rendering device is a content display device, this device comprises a content display zone, and the first region of interest is located outside the display zone of the display device.

In systems that are deployed at present, it has been found that the large number of display devices such as screens in the same place makes the customer experience very tiring because, if all of the screens are activated at the same time, this creates a significant cognitive load for said customer.

Activating a function of a display device only when a person stares at a point in a region of interest thus improves this situation by offering greater visual comfort by activating only the one or more screens corresponding to the products being looked at, and a richer immersive experience for the customers in a store.

In one particular embodiment, the first content-rendering device is an audio rendering device. In systems that are deployed at present, it has also been found that the large number of audio rendering devices that are triggered at the same time stresses a customer. Activating a function of an audio rendering device only when a person is staring at a point in a region of interest thus improves this situation by offering greater acoustic comfort by activating only the one or more devices associated with the products specifically being looked at.

In one particular embodiment, the feature whereby the person is staring at a point in a first region of interest is independent of the duration for which they stare at this point.

In one particular embodiment, the determination step comprises computing a first score relating to the first region of interest, and the method furthermore comprises a step of obtaining a second score relating to a second region of interest stared at by the person, the second region being associated with a second rendering device, and the first rendering device is activated if the first score is greater than the second score.

The score relating to a region is representative of the person's interest in this region of interest. Thus, even if for a short period of time (for example 400 milliseconds), gaze is directed toward multiple regions of interest associated with various rendering devices, only the one associated with the region of interest having the highest score, that is to say the one looked at most, is activated.

In one particular embodiment, the step of activating a function of the first content-rendering device comprises the following steps: obtaining at least one content selection criterion; and selecting content on the basis of the at least one criterion.

By selecting the content on the basis of a criterion, for example relating to a use context of the rendering device, to the current configuration of this device, to a profile or a particular behavior of the person, the relevance of the content presented to the person is thus improved.

In one particular embodiment, the step of activating a function of the first content-rendering device comprises triggering the rendering of the content or modifying at least one configuration parameter of the first rendering device.

In one particular embodiment, the image is captured following the reception of a detection signal concerning the presence of the person in the presence zone.

According to this embodiment, the capture device is triggered when a person is located close to the rendering device, that is to say in the presence zone, and is therefore likely to listen to or look at the content rendered by this device. The energy consumption of the capture device and of the activation device described above is thereby also reduced.

As a variant, the capture device is configured to capture an image at regular time intervals, and the person is detected in the captured image.

Furthermore, when no person is detected for a given duration (for example 10 seconds) or when no person is present in the presence zone covered by said presence/proximity sensor, the content-rendering device may be configured to go into an energy-saving mode (for example: display a still image, dim or even turn off the screen, output background music). The activation of a function of the rendering device is then triggered only after analyzing the gaze of a person present in the detection zone.

According to a second aspect, the invention relates to a content-rendering system comprising: a content-rendering device; an image capture device configured to exit a sleep mode in response to the reception of a detection signal concerning the presence of a person in a presence zone, the signal being emitted by a presence sensor; and an activation device for activating at least one function of a rendering device in accordance with the activation device described above.

In one particular embodiment, the image capture device is integrated into the content-rendering device.

In one particular embodiment, the activation device for activating at least one function of a rendering device is integrated into the content-rendering device.

In one particular embodiment, the content-rendering device is equipped with a wireless communication module configured to communicate with a remote server via a communication network, and at least one of the modules of the activation device for activating at least one function of a rendering device is incorporated into the server.

In one particular embodiment, the various steps of the method for activating a function of a content-rendering device are determined by computer program instructions.

As a result, the invention also targets a computer program on an information medium, this program being able to be implemented by an activation device for activating a function of a rendering device, or more generally in a computer, this program comprising instructions designed to implement the steps of a method for activating a function of a content-rendering device as described above.

This program may use any programming language and be in the form of source code, object code or intermediate code between source code and object code, such as in a partially compiled form, or in any other desirable form.

The invention also targets a computer-readable information medium or recording medium comprising instructions for a computer program as mentioned above.

The information medium or recording medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium or recording medium may be a transmissible medium such as an electrical or optical signal, which may be routed via an electrical or optical cable, by radio or by other means. The program according to the invention may be, in particular, downloaded over the Internet.

As an alternative, the information medium or recording medium may be an integrated circuit in which the program is incorporated, the circuit being designed to execute or to be used in the execution of one of the methods in question.

Figure 1B:
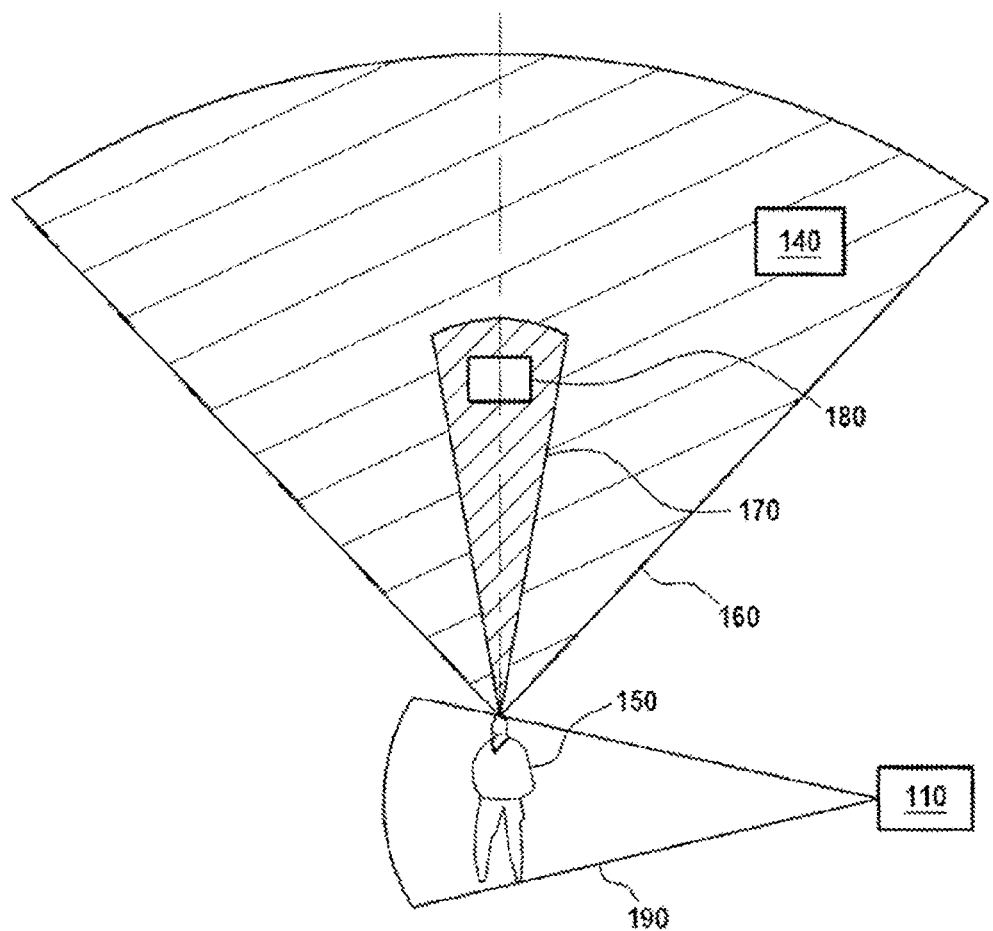
Figure 2:
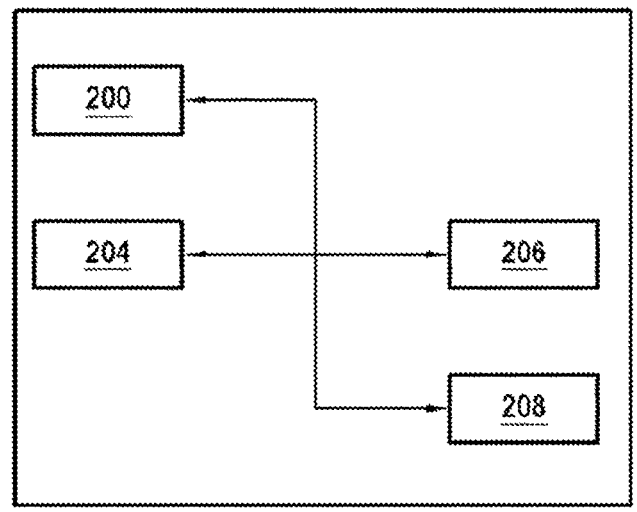
Figure 3:
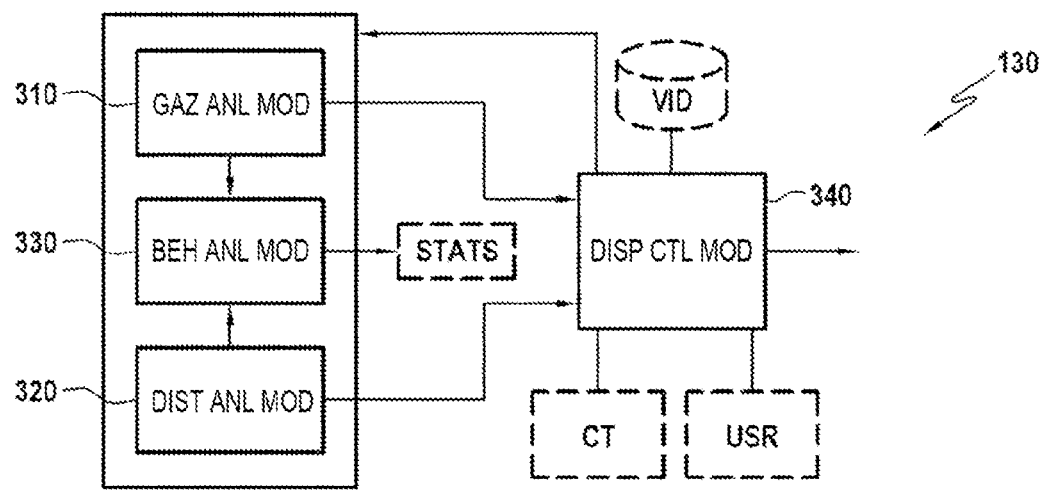
Figure 4:
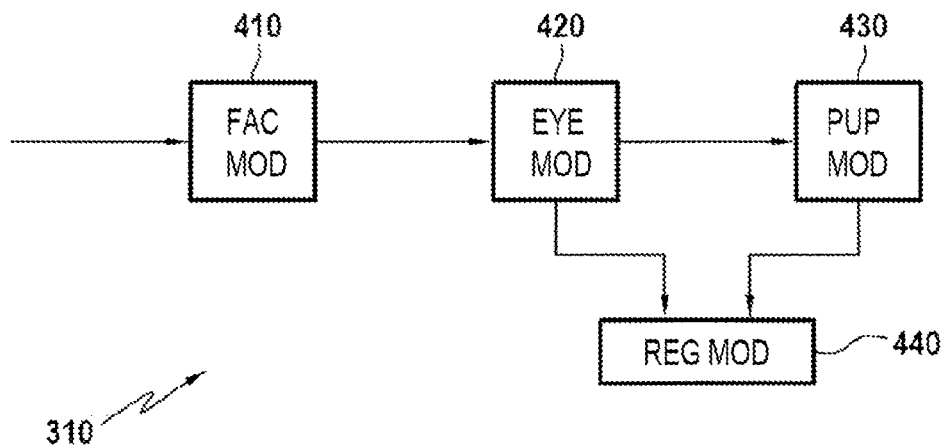
Figure 5:
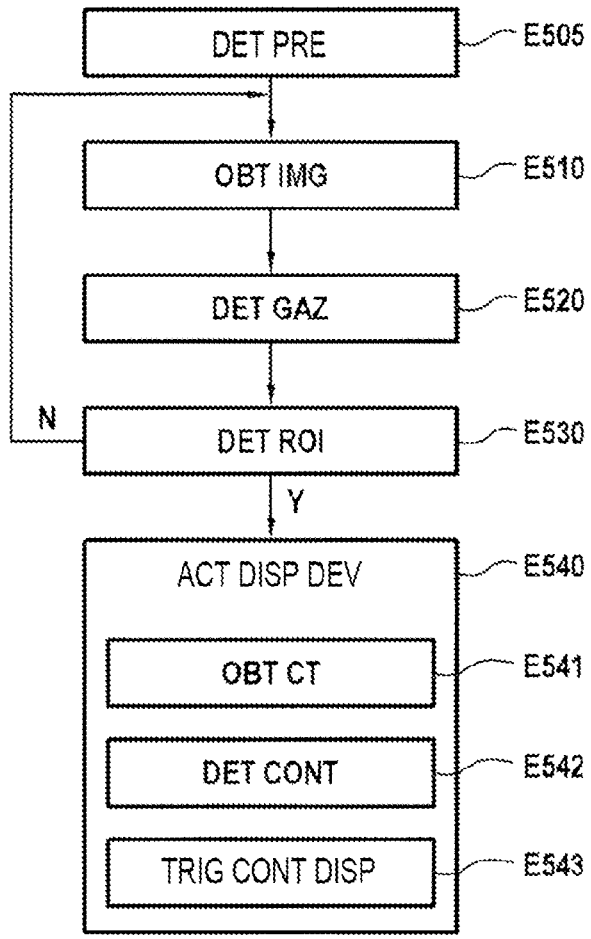
Figure 6:
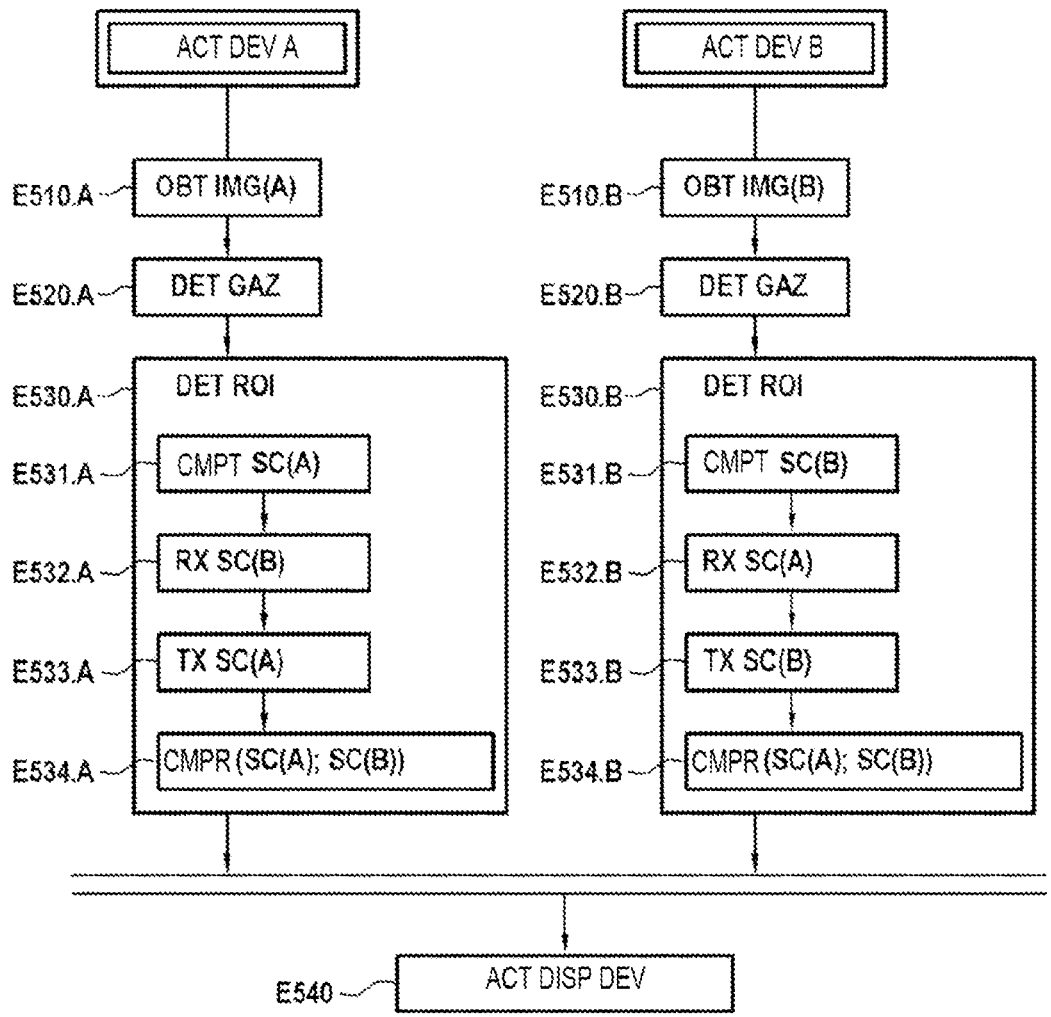

Other features and advantages of the present invention will emerge from the description given below, with reference to the appended drawings that illustrate one exemplary embodiment thereof that is in no way limiting. In the figures:

FIG. 1A schematically shows one example of an architecture of a system in which the proposed technique may be implemented, and FIG. 1B shows one example of an application scenario;

FIG. 2 schematically shows one example of a hardware architecture of an activation device for activating a function of a rendering device, according to one particular embodiment;

FIG. 3 schematically shows an activation device for activating a function of a rendering device, according to one particular exemplary embodiment;

FIG. 4 schematically shows a gaze analysis module of an activation device for activating a function of a rendering device, according to one particular embodiment;

FIG. 5 shows, in the form of a flowchart, the main steps of a method for activating a function of a content-rendering device, according to one particular embodiment; and, FIG. 6 shows, in the form of a flowchart, the main steps of a method for activating a function of a content-rendering device, according to one particular embodiment.

FIG. 1A schematically shows one example of an architecture of a system in which the proposed technique may be implemented. The system 100 comprises a sensor 110 configured to transmit an activation signal to an image capture device 120 in response to the detection of the presence of a person in a presence zone 190 determined by properties of the sensor. The sensor is for example a presence detector or proximity detector, an infrared sensor or a sensor operating based on the time-of-flight principle. The activation signal is transmitted for example when the person is less than 40 cm away from the sensor.

Upon reception of the activation signal, the image capture device 120 exits a sleep mode and triggers the capture of an image or of a sequence of images. The image capture device 120 is for example a photographic camera or a video camera positioned so as to be able to capture at least a portion of the detected person, such as their face or at least one of their eyes. The generated image is then transmitted to an activation device 130 that, following an analysis described with reference to FIG. 5 or FIG. 6, decides whether or not to transmit an activation signal to activate at least one function of the content-rendering device 140.

In one particular embodiment, the content-rendering device is an electronic shelf label. A region of interest corresponding to the position of a product on the shelves of a store or in a display case is associated with the electronic shelf label. The image capture device and content-rendering device may then be fixed on one and the same edge strip of the shelf in a store, for example a few centimeters from the other.

In one particular embodiment, all or some of the devices forming the system may be integrated into a single device.

In one particular embodiment, the system comprises multiple rendering devices.

FIG. 1B shows one example of an application scenario. A customer 150 accesses the grocery department of a store, and their presence in a presence zone 190 is detected by a presence/proximity sensor 110.

In response to this detection, the sensor 110 transmits an activation signal to a capture device 120 (not shown in this figure), configured to exit a sleep mode in response to the reception of the signal, and capture one or more images of the pupil and/or iris of the person.

Analyzing this image or these images makes it possible to determine that the customer 150 is staring at a packet of soup 180 or a portion of this packet 180 placed on a shelf in this department, more specifically a point of this product. This packet of soup 180 is associated with a rendering device 140, such as an electronic shelf label.

It is generally accepted that the field of view of a person, although being a cone of revolution by definition, may be represented on a planar section perpendicular to an optical axis. The field of view comprises a central part reduced to a few degrees (for example 3°), also called fixation point. It is then said that the person looks at or stares at a point. The field of view of a person also comprises what is known as a symbol recognition zone having an angle of 40° (+/−20° with respect to the optical axis), and a binocular vision zone having an angle of 120° (60° with respect to the optical axis).

In this example, the optical axis is represented by a hatched straight line starting from the optical center of the eye of the person and passing through the packet of soup 180, the packet of soup 180 is located in the symbol recognition zone 170, and the rendering device 140 is located in the binocular vision zone 160. This zone 160 is illustrated in FIG. 1B by hatching having a large spacing, and does not comprise the zone 170 represented by hatching having a smaller spacing. The packet of soup 180 is thus located close to but outside a zone in which the rendering device 140 is located.

More precisely, it is not looking at a display zone (for example the screen) of the rendering device 140 that activates a function, but rather staring at a point in a region of interest, the region of interest not corresponding to at least a part of this screen.

If the product 180 is for example located 0.85 meters away from the customer 150 (this distance corresponding to a typical distance at which a customer faces a shelf when looking for a product), the rendering device 140 is located at a distance of one meter from the customer 150 (this distance corresponding for example to the optimum distance for viewing the electronic shelf label as a whole), and the angle between the product and the device 140 is 45°, then the distance between the product 180 and the device 140 will be equal to 41 cm.

After having determined that the customer 150 is staring at the packet of soup 180, the activation device 130 activates a function of the electronic shelf label, for example by triggering the display of a promotional video for the packet of soup 180, along with the price of the packet of soup 180.

FIG. 2 schematically shows an activation device 130 for activating a function of a rendering device according to one particular exemplary embodiment.

The activation device for activating a function of a rendering device in this example comprises at least one processor 200 (or more generally a controller), a non-volatile memory 204, a volatile memory 206 and a communication interface 208.

The memory 204 is a rewritable non-volatile memory or a read-only memory (ROM), this memory constituting a recording medium (or information medium) according to one particular embodiment, able to be read by the activation device 130 for activating a function of a rendering device, and on which there is recorded a computer program PG1 according to one particular embodiment. This computer program PG1 comprises instructions for executing the steps of an activation method according to one particular embodiment. The main steps of this method are shown, in one particular embodiment of the invention, in FIG. 5 and FIG. 6 described below.

The processor 200 uses the volatile memory 206 to execute the computer program PG1 during the implementation of the activation method.

As shown in FIG. 3, according to one particular embodiment, the processor 200 driven by the computer program PG1 here implements a certain number of modules, namely: a gaze analysis module 310, a control module 340, a distance analysis module 320 and a behavior analysis module 330.

FIG. 4 schematically shows a gaze analysis module 310 of an activation device 130 for activating a function of a rendering device, according to one particular exemplary embodiment.

The gaze analysis module 310 comprises multiple sub-modules:
- an eye detection module 420 configured to detect the location of at least one eye in an image depicting a person or the face of a person;
- a determination module 440 configured to determine whether the person is staring at a predetermined region of interest, based on the analysis of the position of an eye or of the position of the pupil of an eye;
- optionally a face detection module 410 configured to detect whether or not one or more faces are present in an image taken by the image capture device 120; and
- optionally a module 430 for detecting the pupil and/or the iris of an eye in an image.

More precisely, in one particular embodiment, the face detection module 410 analyzes the image captured by the capture device 120 and identifies a face. In this case, the module 410 extracts the detected face so as to generate an image of the detected face. As a variant, the module 410 generates a bounding box that characterizes the position of the detected face in the image of the person. These data are then transmitted to the eye detection module 420, which, in a similar manner, analyzes the image received from the face detection module 410. If it identifies at least one eye, it generates an image of the detected eye or, as a variant, generates a new bounding box that characterizes the position of the detected eye in the received image. These data are then transmitted either to the determination module 440 or to the module 430 for detecting the pupil and/or the iris of an eye, which determines the position of the pupil before transmitting it to the determination module 440.

In one particular embodiment, the determination module 440, on the basis of the data received from the eye detection module 420 or from the module 430 for detecting the pupil and/or the iris of an eye, computes a score characterizing whether the detected person actually looked at a given zone of the space, called region of interest, with a certain degree of interest. This score is representative of the person's interest in this zone. In one particular embodiment, the determination module takes a sequence of images as a basis for carrying out this computation, and multiple metrics may be taken into account to compute this score, such as the duration (sometimes called fixation) for which gaze was fixed on the zone, the average size of saccades (that is to say the size of a jump from one fixation to another), the path of the gaze, the speed at which the gaze scanned the scene, etc. If the score is greater than a threshold value, then the determination module 440 considers that the detected person actually looked at the zone of the space with a certain degree of interest. This threshold value is for example between 0 and 1.

Thus, if the average duration of fixation is for example 275 milliseconds (which corresponds to an average value in a visual search), and if the average size of saccades is 3 degrees (in viewing angle degrees, this value also being an average value in a visual search), then the threshold value is for example equal to 1.

Returning to FIG. 3, the processor 200 also implements a control module 340. According to one particular embodiment, this module determines the action to be performed on the content-rendering device 140 on the basis of at least one selection criterion from among:

the use context of the content-rendering device 140 (for example the date on which the device is used, the location of the store in which it is used, the shelf on which the device is placed), the current configuration of the content-rendering device 140 (for example depending on the content currently being rendered by the content-rendering device 140, depending on the brightness level or the sound level), the profile of the detected person;

and/or the evolution of the position of the detected person (for example depending on whether they are approaching or moving away from the system).

According to one particular embodiment, the control module 340 is coupled to a database (VID) referencing multimedia contents, such as audio sequences, images and/or videos associated with the viewed zone. The control module 340 is configured to:

obtain information relating to the use context (CT) of the rendering device 140, to the current configuration of the rendering device 140, to the profile (USR) of the detected person and/or to the evolution of the position of the detected person;

select content on the basis of at least one of these criteria, by applying predefined rules; and, transmit, to the rendering device 140, a signal intended to render the selected content.

When the zone corresponds to a zone in which a product is arranged (for example on the shelves of a store or in a display case), the selected content corresponds for example to an image such as a QR code ("quick response" code). This code may be scanned by the person using their telephone so as to obtain a promotion on the product at the checkout, information about the list of components of the product or, in the case of a food product, information about the nutritional value of the product in question.

As a variant, the action triggered on the content-rendering device 140 corresponds to an increase in brightness and/or volume of the rendering device and/or to activation of a short-range wireless communication module of the rendering device, so as to be able for example to transmit a promotion on the product in question to the telephone of the detected person.

The profile of the detected person is for example generated or supplied on the basis of the products that they have previously viewed. The profile may comprise the history of viewed products, the history of products collected with a view to purchasing them, and optionally other information such as personal characteristics that could have a strong influence on the interaction (for example age, gender, etc.) or personal preferences.

According to one embodiment, the image capture device 120 and activation device 130 are integrated into the device 140 so as to form a compact system 100, and a plurality of systems 100 are connected to one another, for example in a mesh topology, through a wireless telecommunications network. They exchange information (for example the score described above, or information determined by analyzing images captured by the capture device, such as the fact that the person has collected a product). In this context, the profile of a person is preferably updated locally by each system 100.

As a variant, the activation device 130 for activating a function of a rendering device 140 is integrated into a remote equipment, such as a server, and the profile of a person is updated centrally, in particular by virtue of the information transmitted by the image capture devices 120.

The control module 340 may possibly be connected to an analysis module 320 for analyzing the distance of the detected person, which module is for example connected to the sensor 110 so as to determine the evolution of the position of the detected person. The control module 340 may thus be configured to adapt the content presented to a person in real time, depending on whether they are approaching or moving away from the rendering device 140.

According to one particular embodiment, once the selected content has been rendered by the content-rendering device 140, the control module 340 may inform the analysis module 310 and/or 320 of the action in progress (feedback loop). The analysis module 310 and/or 320 may thus track the evolution of the behavior of the person (for example their position by analyzing the data supplied by the sensor 110 or their facial expression by analyzing images captured by the capture device 120) once the rendering device 140 has been triggered, and thus evaluate whether the action had an effect on the customer (for example whether the person collected the product with a view to purchasing it).

Optionally, the activation device 130 for activating a function of a rendering device comprises an analysis module 330 for analyzing the behavior of people detected by the system 100. This module is configured to carry out, in real time or a posteriori, behavioral analysis of the detected people so as to understand the actions of these people, the importance of one criterion rather than another, the shelves that attract them most, the products they are looking for or the motivations for their purchase.

The behavior analysis module 330 generates statistics, for example, which may be represented in the form of heat maps on the basis of data such as:

the position of the detected people, on the basis of the data supplied by the distance sensor 110, or by analyzing a sequence of images captured by one or more image capture devices 120;

the speed of the detected people;

the number of people who have passed through a department or in front of a specific product;

the time spent in front of the rendering device 140;

the number of people who have viewed a particular product;

the duration for which a specific product was viewed;

the number of products collected by people in the department of a supermarket, as a function of the time of day;

the number of times a promotion was offered to people who were looking at a product versus the number of times this same product was purchased.

According to one embodiment, the image capture device 120 and activation device 130 are integrated into the image content-rendering device 140. This configuration offers the advantage of being compact.

As a variant, at least one of the modules of the activation device for activating a function of a rendering device is integrated into a remote equipment (such as a server, a gateway or any other equipment), and the image capture device 120 and content-rendering device 140 are connected to this remote equipment via a telecommunications network, for example a radio network, the Internet, a Wi-Fi network, a Bluetooth network, or a fixed or mobile telephony network.

FIG. 5 shows, in the form of a flowchart, the main steps of a method for activating a function of a content-rendering device, according to one particular embodiment.

In an optional step E505, the sensor 110 detects the presence of a person in a presence zone located close to the rendering device 140 (for example 1 meter). In this case, the sensor 110 transmits an activation signal to the image capture device 120, which exits a sleep mode and captures an image or a sequence of images of at least a portion of the eyes (for example the iris and/or the pupil) of the detected person.

The captured image is transmitted by the image capture device 120 to the activation device 130 for activating a function of a rendering device. The device 130 receives this image in a step referenced E510.

In step E520, the activation device 130 determines the gaze direction of the detected person, that is to say the direction of the fixation point looked at by the person, by analyzing the obtained image.

According to one particular embodiment, the face detection module 410 detects a face and extracts the detected face so as to generate an image of the detected face. As a variant, the module 410 generates a bounding box that characterizes the position of the detected face in the image of the person. These data are then transmitted to the eye detection module 420, which, in a similar manner, analyzes the image received from the face detection module 410. If it detects at least one eye, it generates an image of the detected eye or, as a variant, generates a new bounding box that characterizes the position of the detected eye in the received image. These data are then transmitted either to the determination module 440 or to the module 430 for detecting the pupil and/or the iris of an eye, which determines the position of the pupil and/or of the iris before transmitting it to the determination module 440.

In step E530, the activation device 130 determines whether the detected person has actually stared at a point in a region of interest located close to but outside a zone in which the first rendering device is located.

According to one particular embodiment, the feature whereby the person is staring at a point in a region of interest is independent of the duration for which the point is stared at.

According to one particular embodiment, the determination module 440 computes a score on the basis of the data received from the eye detection module 420 or from the module 430 for detecting the pupil/the iris of an eye. In one particular embodiment, the determination module takes a sequence of images as a basis for carrying out this computation, and multiple metrics may be taken into account, such as the duration for which gaze was fixed on the zone, the path of the gaze, the speed at which the gaze scanned the scene, and/or blinking frequency. If the score is greater than a threshold value, then the determination module 440 considers that the gaze of the detected person was actually fixed on a given zone of the space associated with the content-rendering device.

As a variant, when the gaze of the person is fixed on multiple zones of the space, the determination module 440 determines the zone of the space that was of greatest interest to the detected person.

As a variant, the determination module 440 determines whether the person actually stared at a point in a region of interest, without a score being computed.

In step E540, the activation device 130 activates at least one function of the content-rendering device associated with the zone on which the gaze of the person was fixed.

According to one particular embodiment, the action to be performed on the content-rendering device 140 is determined on the basis of the use context of the rendering device 140 (that is to say the date, the location of the store, the department in which the associated product is placed), the current configuration of the rendering device 140 (that is to say according to the content currently being displayed by the content-rendering device 140), the profile of the detected person and/or the evolution of the position of the detected person (that is to say depending on whether they are approaching or moving away from the system).

According to one particular embodiment, the control module 340 of the activation device 130 is configured to:

obtain, in a step E541, information relating to the context, to the current configuration of the content-rendering device 140, to the profile of the detected person and/or the evolution of the position of the detected person;

select, in a step E542, content on the basis of these criteria, by applying predefined rules; and, transmit, to the content-rendering device 140, a signal intended to render the selected content, in a step E543.

According to one particular embodiment, after having triggered the display of particular content, the activation device 130 for activating a function of a rendering device determines the evolution of the behavior of the detected person. To this end, the activation device 130:

determines, through image analysis, the evolution of the position of the person, the evolution of their facial expression, and/or whether the person collects the product with a view to purchasing it;

and optionally updates the user profile (USR) of the person with the determined information and/or informs the behavior analysis module 330.

FIG. 6 shows, in the form of a flowchart, the main steps of a method for activating a function of a content-rendering device, according to one embodiment of the invention.

According to this embodiment, at least a first and second activation device 130 for activating a function of a rendering device are associated with at least a first and second content-rendering device 140, and the two activation devices 130 communicate with one another via their communication interface 208, in order to determine at least one function to be activated on at least one of the content-rendering devices 140.

Each of the first and second activation devices implements steps E510 and E520 (described above).

In a step E530.A, the first activation device determines whether the person is staring at a point in a first region of interest located close to and outside a zone in which the rendering device is located.

To this end, the first activation device, in a step E531.A, computes a first score representative of the interest shown by the person in a first region of interest associated with the first content-rendering device.

In a step E532.A, the first activation device receives, from the second activation device, a second score representative of the interest shown by the person in a second region of interest associated with the second content-rendering device.

In a step E533.A, the first activation device transmits the first score to the second activation device.

The second activation device also implements symmetrical steps, which are referenced E531.B, E532.B and E533.B.

Finally, in a step E534 (E534.A and E534.B), each of the first and second activation devices compares the two scores. If the first score is greater than the second score, the first activation device activates a function of the first content-rendering device. Otherwise, the second activation device activates a function of the second content-rendering device.

In one particular embodiment, a first activation device determines that the detected person is moving, determines the direction taken by this person, and transmits an activation signal to at least one second activation device, such that the second rendering device associated with the second activation device is activated when the person passes in the vicinity of this device.

In one particular embodiment, only one activation device 130 is necessary, and is configured to analyze images from two capture devices, and to drive two content-rendering devices.

The invention claimed is:

1. A method for activating a function of a first content-rendering device, the method comprising:
   obtaining at least one image of at least a portion of eyes of a person detected in a presence zone associated with the first content-rendering device, a capture of said at least one image being triggered by reception of a detection signal concerning a presence of the person in the presence zone;
   determining, by analyzing the at least one obtained image, that the person is staring at a point in a first region of interest located close to and outside a zone in which the first content-rendering device is located, wherein determining that the person is staring at a point in a first region of interest located close to and outside a zone in which the first content-rendering device is located comprises computing a first score relating to the first region of interest;
   obtaining a second score relating to a second region of interest stared at by the person, the second zone being associated with a second content-rendering device;
   comparing the obtained second score with the first score; and
   activating at least one function of the first rendering device if the first score is greater than the obtained second score.

2. The method of claim 1, wherein the first content-rendering device is a display device for displaying said content, this device comprising a display zone for displaying content, said first region of interest being located outside the display zone of the display device.

3. The method of claim 1, wherein activating at least one function of the first content-rendering device comprises:
   obtaining at least one content selection criterion; and
   selecting content on the basis of said at least one content selection criterion.

4. The method of claim 1, wherein activating at least one function of the first content-rendering device comprises triggering a rendering of the content or modifying at least one configuration parameter of the first content-rendering device.

5. A computer comprising a processor and a memory, the memory having stored thereon instructions which, when executed by the processor, cause the processor to implement the method of claim 1.

6. A non-transitory computer-readable storage medium (having stored thereon instructions which, when executed by a processor, cause the processor to implement the method of claim 1.

7. The method of claim 1, wherein method is carried out by a first activation device, wherein the second score is received from a second activation device, and wherein the method further comprises transmitting the first score to the second activation device.

8. An activation device for activating a function of a content-rendering device, comprising:
   an obtaining module for obtaining at least one image of at least a portion of eyes of a person detected in a presence zone associated with the first rendering device, a capture of said at least one image being triggered by reception of a detection signal concerning a presence of the person in the presence zone;
   a gaze analysis module configured to determine, by analyzing the at least one obtained image, that the person is staring at a point in a first region of interest located close to and outside a zone in which the first content-rendering device is located, wherein the gaze analysis module is configured to compute a first score relating to the first region of interest;
   wherein the obtaining module is further configured for obtaining a second score relating to a second region of interest stared at by the person, the second zone being associated with a second content-rendering device;
   wherein the activation device is configured to compare the first score and the obtained second score; and
   wherein the activation device further comprises a control module configured to activate at least one function of the first rendering device if the first score is greater than the obtained second score.

9. The activation device of claim 8, wherein the obtaining module is configured to receive the second score from another activation device and wherein the activation device is configured to transmit the first score to the other activation device.

10. A content-rendering system comprising:
    a first content-rendering device;
    a second content-rendering device
    an image capture device configured to exit a sleep mode in response to reception of a detection signal concerning a presence of a person in a presence zone, the signal being emitted by a presence sensor;

the activation device of claim 8.

11. The system of claim 10, wherein the image capture device is integrated into the first content-rendering device.

12. The system of claim 10, wherein the activation device is integrated into the first content-rendering device.

13. The system of claim 10, wherein the first content-rendering device comprises a wireless communication module configured to communicate with a remote server via a communication network, and wherein at least one module of the activation device is incorporated into said server.

* * * * *